(12) United States Patent
Kamada

(10) Patent No.: US 6,515,709 B1
(45) Date of Patent: Feb. 4, 2003

(54) IMAGE DISPLAY APPARATUS CAPABLE OF SUPPRESSING ADVERSE INFLUENCES CAUSED BY REPETITIVE IMAGE CONTENTS

(75) Inventor: Mikio Kamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/404,477

(22) Filed: Sep. 24, 1999

(30) Foreign Application Priority Data

Sep. 28, 1998 (JP) .......................................... 10-273125

(51) Int. Cl.[7] .......................... H04N 5/44; H04N 17/00; H04N 5/21
(52) U.S. Cl. ........................ 348/553; 348/180; 348/607
(58) Field of Search ................................ 348/553, 180, 348/607, 625, 913, 739, 379; H04N 5/44, 17/00, 5/21

(56) References Cited

U.S. PATENT DOCUMENTS 5,589,883 A * 12/1996 Ogino ........................ 348/379

* cited by examiner

*Primary Examiner*—Sherrie Hsia
(74) *Attorney, Agent, or Firm*—Sonnenschein, Nath & Rosenthal

(57) ABSTRACT

The invention includes an image processing unit in an image display apparatus. The image processing unit includes a setting unit comprising controls that are configured to be set to an acceptable level. The acceptable level is a function of at least one affecting factor that affects a biological unit. The image processing unit also includes a converting unit coupled to the setting unit. The converting unit is configured to receive input image information and an extracted value. The extracted value is a function of the input image information. The converting unit further includes components that process the input image information, the extracted value, and the acceptable level to produce a display signal.

20 Claims, 4 Drawing Sheets

IMAGE DISPLAY APPARATUS CAPABLE OF SUPPRESSING ADVERSE INFLUENCES CAUSED BY REPETITIVE IMAGE CONTENTS

BACKGROUND OF THE INVENTION

1. Field of the Invention

The present invention generally relates to an image display apparatus, and more specifically, is directed to an image display apparatus capable of avoiding that a displayed repetitive image gives an adverse influence to a biological body of a display viewer.

2. Description of the Related Art

Very recently, adverse influences will be possibly given to viewers (biological bodies) who are watching TV images, or video game images displayed on image display apparatuses, while these images may cause these adverse influences. Japanese newspaper announces very serious problems, for instance, while children viewed the TV animation program, this TV animation induced photosensitive epilepsy of the children.

Presently, two solution manners are provided.

As the first solution manner, TV program broadcasting of risky stimuli patterns is prohibited as defined in, for example, the TV broadcasting regulations effective in the Great Britain. In accordance with this British TV broadcasting regulations, TV program broadcasting of the repetitive stimuli having the frequency higher than, or equal to 3 Hz is prohibited. The reason why broadcasting of such a 3 Hz-frequency repetitive stimulation is prohibited is given as follows. A color repetitive image having a frequency of several tens Hz and containing a red image component is especially harmful to such a biological body having a photosensitive epileptic factor.

As the second solution manner, for example, every person who owns such a photosensitive epileptic factor is tried not to watch a television image which may possibly induce this disease.

However, these first and second solution manners own the following problems. In other words, although this first solution manner may be useful and also safe for any person who owns, for example, such a photosensitive epileptic factor, other persons who do not have such a photosensitive epileptic factor are forcibly limited to enjoy various sorts of TV image representations.

Also, the second solution manner may deprive possibilities of enjoying various sorts of TV image representations from any persons who have such a disease factor. As an example, children who own such a disease factor cannot observe a TV animation program, while this TV animation program becomes popular among other children who never have such a disease factor.

It should be understood that there are many other cases than the above-explained photosensitive epileptic problem. For example, swing-images and/or images which are intentionally swung may induce unpleasant feelings to some persons, and/or may give risky matters to some persons. That is, TV images may possibly give adverse influences to biological bodies.

The essential causing point of the above-described problems such that the TV images and the like may give these adverse influences, or harmful to the biological bodies implies such a fact that "while the sorts/degrees of unpleasant/risky matters are different from each other, depending upon individuals, a picture which never gives any adverse influences to a large number of viewers may become harmful to only a limited number of viewers." In other words, there is a fact that the conventionally available television receivers, or image display apparatuses never consider the different feelings among individuals.

SUMMARY OF THE INVENTION

The present invention has been made to solve the above-explained conventional problems, and therefore, has an object to provide an image display apparatus capable of suppressing an adverse influence caused by a displayed image, which may be given to a biological body who owns a disease factor.

To achieve the above-described object, an image display apparatus, according to an aspect of the present invention, is featured by comprising:

acceptable level setting means for setting an acceptable level with respect to a factor for giving an influence to a biological body, the influence giving factor being contained in input image information;

level converting means for converting a level of the influence giving factor contained in the input image information into another level in response to the acceptable level set by the acceptable level setting means; and display means for displaying thereon such input image information produced by level-converting the influence giving factor by the level converting means.

In accordance with such an image display apparatus, for example, a person who owns a photosensitive epileptic factor may set the own acceptable repetitive stimuli by using the acceptable level setting means. The level converting means may convert the influence causing level contained in the input image information into this set acceptable level. As a result, the input image information can be displayed on the display means with maintaining such a level of repetitive stimuli which never gives any adverse influences to the person who owns the photosensitive epileptic factor. Eventually, even when the person who owns such a disease factor enjoys the images which may possibly give the repetitive stimuli, he is not adversely influenced by these repetitive stimuli.

BRIEF DESCRIPTION OF THE DRAWINGS

A more better understanding of the present invention will become apparent from a detailed described to be read in conjunction with the drawings, in which.

DETAILED DESCRIPTION OF THE PREFERRED EMBODIMENTS

Referring now to drawings, various preferred embodiments of the present invention will be described in detail.

ARRANGEMENT OF FIRST IMAGE DISPLAY APPARATUS

Figure 1:
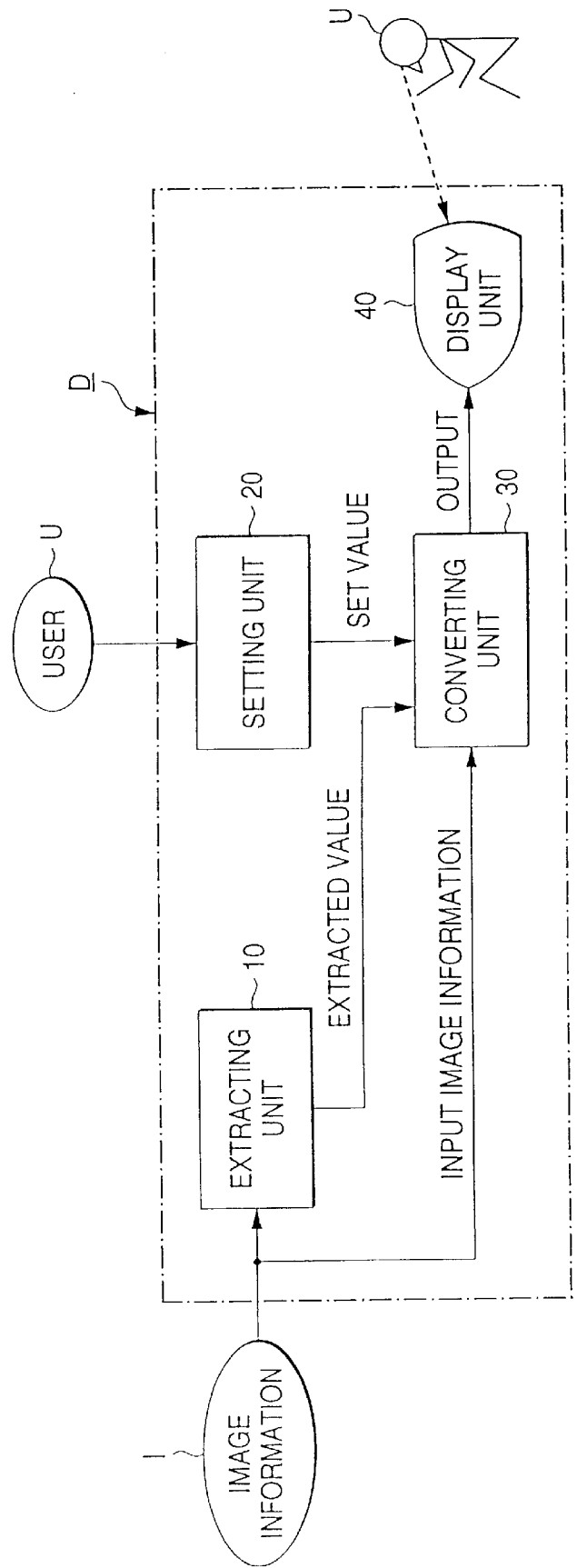
FIG. 1 is a schematic block diagram for indicating an arrangement of a major unit of an image display apparatus according to a first embodiment of the present invention.
Figure 2:
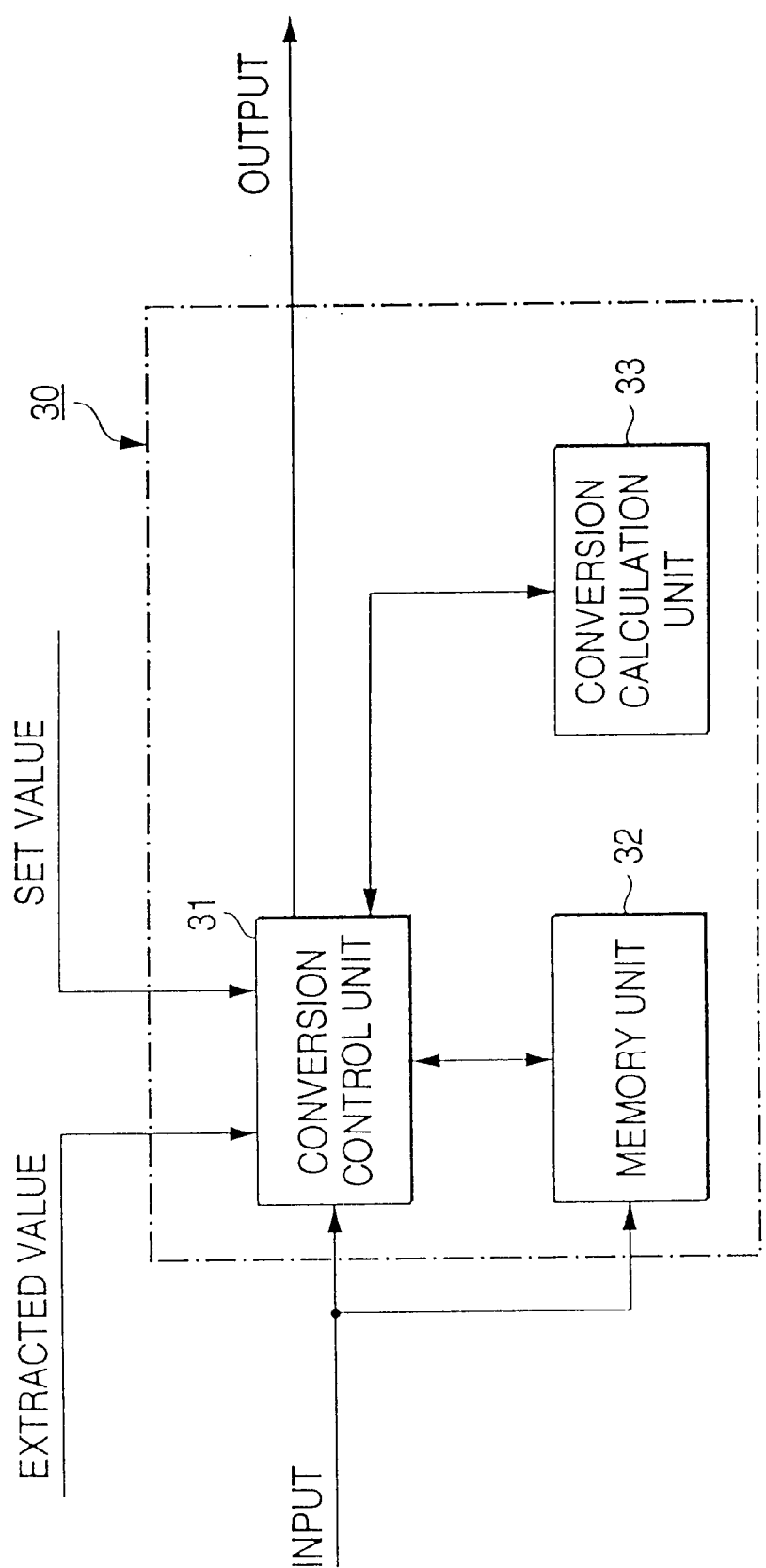
FIG. 2 is a schematic block diagram for representing an internal arrangement of the converting unit 30 employed in the image display apparatus of FIG. 1.

FIG. 1 is a schematic block diagram for indicating an arrangement of a major unit (image processing unit "D") of an image display apparatus according to a first embodiment of the present invention. FIG. 2 is a schematic block diagram for representing an internal arrangement of the converting unit 30 employed in the image display apparatus D of FIG. 1.

As indicated in FIG. 1 and FIG. 2, the image processing apparatus "D" of this first image display unit is arranged by employing an extracting unit 10, a setting unit 20, a converting unit 30, and a display unit 40. The extracting unit 10 corresponds to an "extracting means" for extracting image information "I" entered into this image processing apparatus "D" in view of a safety aspect for a biological body, i.e., a user "U". The setting unit 20 corresponds to an "acceptable level setting means". This acceptable level setting means is capable of setting a harmful factor with respect to the user "U" to a safety level (acceptable level) for this user "U". This harmful factor is contained in adverse-influence-giving factors of the image information "I" extracted by the extracting unit 10. This harmful factor may give an adverse influence to the user U if it is left in the input image information. The converting unit 30 corresponds to a "level converting means". This level converting means converts the image information I into a safety level with respect to the biological body in response to the safety level set by the setting unit 20. The display unit 40 may be realized by, for instance, a CRT (cathode-ray tube) monitor of a general-purpose television receiver capable of displaying thereon an image whose level has been safely converted by the converting unit 30.

The extracting unit 10 extracts a risk (harmful) factor which may give an adverse influence by way of a previously designated means. For instance, this extracting unit 10 analyzes and extracts presence of various factors which may be harmful to, for example, a person who has a photosensitive epileptic factor. As these harmful factors, there are repetitive stimulation (stimuli) having a frequency higher than, or equal to 3 Hz, a blurred image, an oblique-swung image, and the like. Then, the extracting unit 10 quantifies degrees of these extracted harmful factors.

The setting unit 20 performs a setting operation involving a function release in which the respective risk factors are set and these risk factors are converted into safety levels. Then, while the set contents by the setting unit 20 are considered, the image data is converted by the converting unit 30 (will be then explained in detail). In the case that a user has a photosensitive epileptic factor, the converting unit 30 selects, for example, degrees of the below-mentioned factors by considering natures of this user (sort, degree, sensitivity of factor), and then converts the selected degrees of the factors. It should be understood that the below-mentioned degrees of user's natures are merely exemplified, and therefore, other factors are apparently considerable.

1). In the case that the user is very sensitive to the repetitive image, the input image is filtered by employing, for example, a low-pass filter to cut off such a repetitive image having a frequency higher than, or equal to 3 Hz.

2). In the case that the user is intermediately sensitive to the repetitive image, the spectrum intensity of the repetitive image having the frequency higher than, or equal to 3 Hz is reduced to ½.

3). In the case that the user is intermediately, or less sensitive to the repetitive image, a frequency of a repetitive image higher than, or equal to 10 Hz is reduced to ¼.

4). In the case that the user is sensitive to such a repetitive image containing a red image component, the color of the repetitive image containing the red image component and having a frequency higher than, or equal to 3 Hz is changed into white.

As an item to be evaluated, various items may be listed up, for instance, a frequency, a spectrum intensity, a spatial frequency, a spatial frequency spectrum intensity, a color, a shape, an image changing degree, and the like.

While values are set, these values are set based upon natures (sort and degree of factor) of users. In such a case that a person owns a photosensitive epileptic factor, values are set with respect to a frequency of a repetitive image, spectrum intensity, and a color. As a converting method thereof, the frequencies (related to both time and space) are reduced; the spectrum intensity are reduced; the colors are replaced (e.g., red color is replaced by pink color, or white color), and blurring operation is carried out.

CONVERTING OPERATION BY CONVERTING UNIT

Now, converting operation of the above-described converting unit 30 employed in the first image processing apparatus D with respect to the evaluation function of the repetitive stimuli will be described.

As represented in FIG. 2, the image information "I" is entered to both a memory unit 32 and a conversion control unit 31. For instance, time sequential image data (see FIG. 3) appearing for approximately 10 seconds contained in this image information "I" is stored into the memory 32. Under control of the conversion control unit 31, a conversion calculation unit 33 performs a FFT (Fast Fourier Transformation) calculation for spatial light intensity of two-dimensional image data every field so as to acquire both a frequency and spectrum intensity of this two-dimensional image data. Then, this conversion calculation unit 33 quantifies the repetitive stimuli contained in the image, and converts this entered image information "I" into a safety level. Thereafter, the conversion calculation unit 33 supplies this safety level from the converting unit 30 to the display unit 40.

In the case that red color intensity is evaluated instead of the above-exemplified light intensity, both repetitive intensity and a frequency of only this red color image component may be quantified by the conversion calculation unit 33. Then, the quantified repetitive intensity and frequency of the red color image component may be converted into safety levels which will be supplied to the display unit 40 in a similar manner to the above case.

Figure 3:
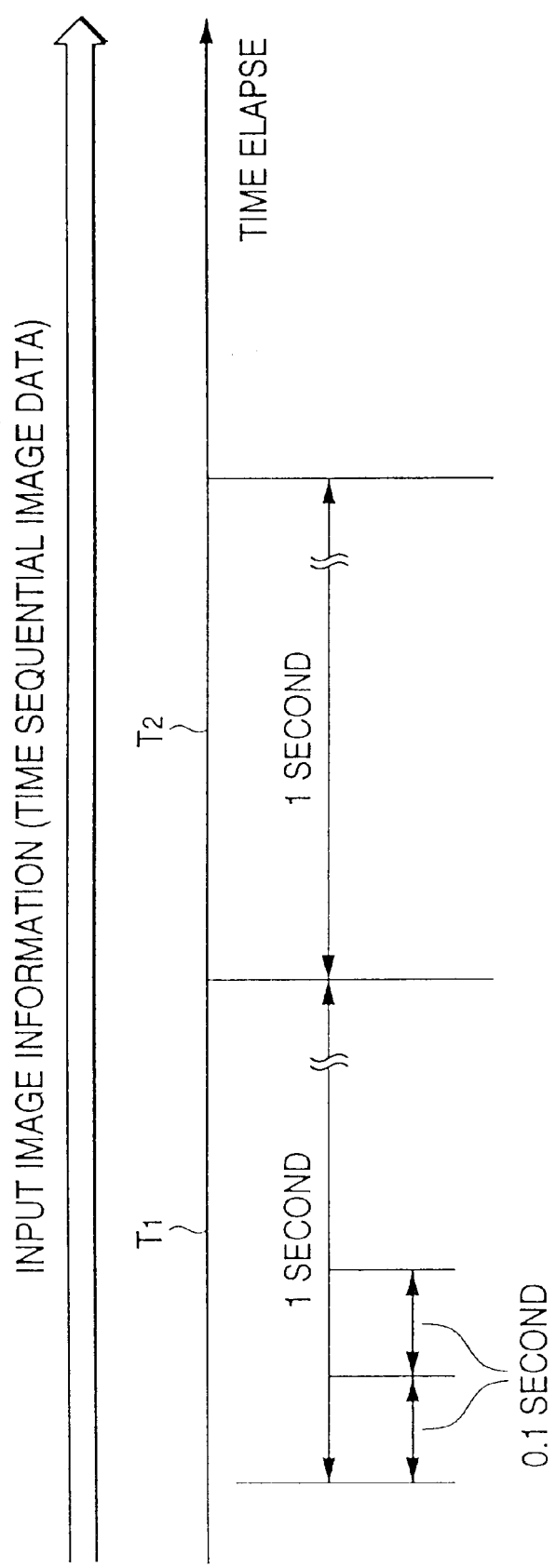
FIG. 3 is a conceptional diagram for explaining a temporal section to be evaluated by the image display apparatus.

In this case, as indicated in FIG. 3, a temporal section to be evaluated may be alternatively set to an arbitrary temporal section (e.g., temporal sections T1 and T2) during which the image information "I" is inputted. Also, overlapped temporal section series may be alternatively evaluated, for instance, temporal section series formed by shifting a 1-second temporal section by 0.1 second. In this alternative evaluation case, there is a merit that a risk factor contained in an input image may be rapidly checked.

It should also be noted that although these functions can be realized by way of a digital signal process operation in a practical case, they may be realized by way of an analog signal process operation.

Further, these functions are preferably processed in real time, or substantially real time. Alternatively, image data which have been recorded on a video tape and other recording media may be sufficiently analyzed and converted for a long time period to record the analyzed/converted image data on this video tape and the like. As a concrete example, it is now assumed that 4 hours are required as animation image processing time. During this animation image processing time, video tape data about 2-hour animation images containing quick movement can be processed in order that any person who owns the above-explained photosensitive epileptic factor can observe this animation image in a safe manner. In this assumption case, for example, the 2-hour animation image data are processed by the above-explained safety securing operation for 4 hours in the nighttime, and then the animation image data which have been processed by the safety securing operation are recorded on other video tapes. Thus, any person who owns the photosensitive epileptic factor may observe these safety-secured animation images in the daytime.

SECOND IMAGE DISPLAY APPARATUS

Figure 4:
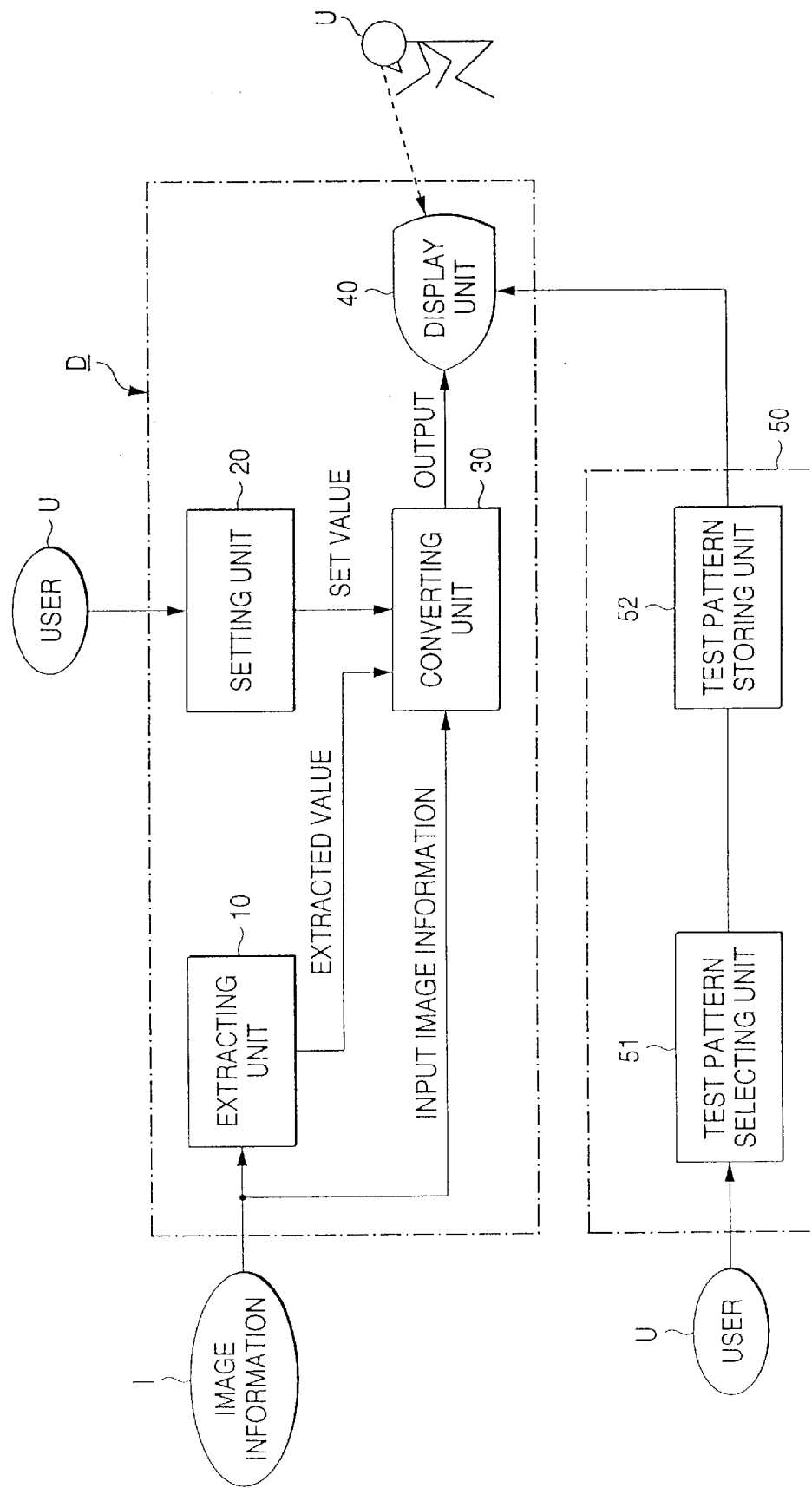
FIG. 4 is a schematic block diagram for indicating an arrangement of an image display apparatus according to a second embodiment of the present invention.

FIG. 4 is a schematic block diagram for showing an arrangement of an image display apparatus according to a second embodiment of the present invention.

This second embodiment is featured by the aspect in that a test pattern unit 50, which is "a test pattern storage means", is additionally provided with the image processing apparatus "D".

In this second embodiment, as shown in FIG. 4, while various test patterns are previously stored into a test pattern storage unit 52 and these test patterns may give various sorts of adverse influences such as a photosensitive epileptic factor to a user "U", this user "U" selects a desirable test pattern via a test pattern selecting unit 51 to be displayed on the display unit 40.

In accordance with this second image display apparatus, for instance, in the general case in which a mother becomes aware of the fact that her child owns a photosensitive epileptic factor, she previously selects such a test pattern corresponding to a degree of the photosensitive epileptic disease owned by her child via the test pattern selecting unit 51, and then displays it on the display unit 40 for her child to observe. While her child is watching this selected test pattern, the mother observes the responses of her child and can determine the limit of repetitions per second of an image which her child can safely view. She adjust the setting unit 20 to match the level determined and displays the set level on the display unit 40. As a consequence, the mother can allow her children to observe the level-converted repetitive stimulus image.

As previously described in detail, in accordance with the present invention, the below-mentioned effects can be achieved.

That is, since the television receiver itself (image processing apparatus) may have the function capable of judging/improving the biological safety degrees of the images, this television receiver can provide safer images to biological bodies.

Also, since the image display apparatus can quantify/evaluate the risk degrees and furthermore the user can set the safety levels (namely, user manually sets safety level and instructs converting method), this image display apparatus can convert the risky images into the biologically safe images with respect to various users who own various biological safety degrees as to the repetitive stimulus images.

What is claimed is:

1. An image display apparatus comprising:
    acceptable level setting means for setting an acceptable level with respect to a factor for giving an influence to a biological body, said influence giving factor being contained in input image information;
    level converting means for converting a level of the influence giving factor contained in the input image information into another level in response to said acceptable level set by said acceptable level setting means; and
    display means for displaying thereon such input image information produced by level-converting the influence giving factor by said level converting means.

2. An image display apparatus as claimed in claim 1 wherein:
    said image display apparatus is further comprised of extracting means for extracting the factor for giving the influence to the biological body, which is contained in entered image information; and
    said level converting means converts a level into an acceptable level corresponding to said influence giving factor extracted by said extracting means.

3. An image display apparatus as claimed in claim 1, or claim 2, further comprising:
    test pattern storing means for storing a test pattern containing a factor for giving an influence to the biological body.

4. An image display apparatus as claimed in claim 2 wherein:
    said influence giving factor extracted by said extracting means is selected from any one of at least a frequency, a spectrum intensity, a spatial frequency, a spatial frequency spectrum intensity, a color, a shape, and an image changing intensity contained in said input image information.

5. In an image display apparatus, an image processing unit comprising:
    a setting unit comprising controls that are configured to be set to an acceptable level, wherein the acceptable level is a function of at least one affecting factor that affects a biological unit; and
    a converting unit coupled to the setting unit, wherein the converting unit is configured to receive input image information and an extracted value, wherein the extracted value is a function of the input image information, and wherein the converting unit further comprises means for processing the input image information, the extracted value, and the acceptable level to produce a display signal.

6. The image processing unit of claim 5, wherein the means for processing comprises a conversion control unit coupled to a conversion calculation unit.

7. The image processing unit of claim 6, wherein the means for processing further comprises a memory unit coupled to the conversion control unit, wherein each of the memory unit and the conversion control unit are configured to receive the input image information.

8. The image processing unit of claim 5, wherein the input image information comprises a first temporal section and a second temporal section, wherein the first temporal section and the second temporal section overlap one another.

9. The image processing unit of claim 5, further comprising:
    an extracting unit configured to produce the extracted value, wherein the extracting unit comprises a set of predetermined risk factors.

10. The image processing unit of claim 9,
    wherein the at least one affecting factor that affects a biological unit is from a group that includes repetitive stimulation (stimuli) having a frequency not less than 3 Hz, a blurred image, and an oblique-swung image, wherein the acceptable level is based on sort, degree, and sensitivity of factor, and wherein the set of predetermined risk factors comprises at least one of a frequency, a spectrum intensity, a spatial frequency, a spatial frequency spectrum intensity, a color, a shape, and an image changing degree.

11. The image processing unit of claim 5, further comprising:

a display unit configured to receive the display signal.

12. The image processing unit of claim 11, further comprising:

a test pattern unit coupled to the display unit.

13. A method for suppressing adverse influences caused by image content, the method comprising:

setting controls in a setting unit to an acceptable level as a function of at least one affecting factor that affects a biological unit, wherein the setting unit is part of an image processing unit that is part of an image display apparatus;

receiving both input image information and an extracted value in a converting unit coupled to the setting unit, wherein the extracted value is a function of the input image information; and processing the input image information, the extracted value, and the acceptable level to produce a display signal.

14. The method of claim 13, wherein processing the input image information comprises employing a conversion control unit coupled to a conversion calculation unit.

15. The method of claim 14, further comprising:

receiving the input image information in both the conversion control unit and a memory unit coupled to the conversion control unit.

16. The method of claim 13, wherein receiving input image information comprises receiving a first temporal section and a second temporal section, wherein the first temporal section and the second temporal section overlap one another.

17. The method of claim 13, further comprising:

producing the extracted value in an extracting unit, wherein the extracting unit comprises a set of predetermined risk factors.

18. The method of claim 17, wherein the at least one affecting factor that affects a biological unit is from a group that includes repetitive stimulation (stimuli) having a frequency not less than 3 Hz, a blurred image, and an oblique-swung image, wherein the acceptable level is based on sort, degree, and sensitivity of factor, and wherein the set of predetermined risk factors comprises at least one of a frequency, a spectrum intensity, a spatial frequency, a spatial frequency spectrum intensity, a color, a shape, and an image changing degree.

19. The method of claim 13, further comprising:

receiving the display signal in a display unit.

20. The method of claim 19, further comprising:

coupling a test pattern unit to the display unit.

* * * * *